Figure 1:
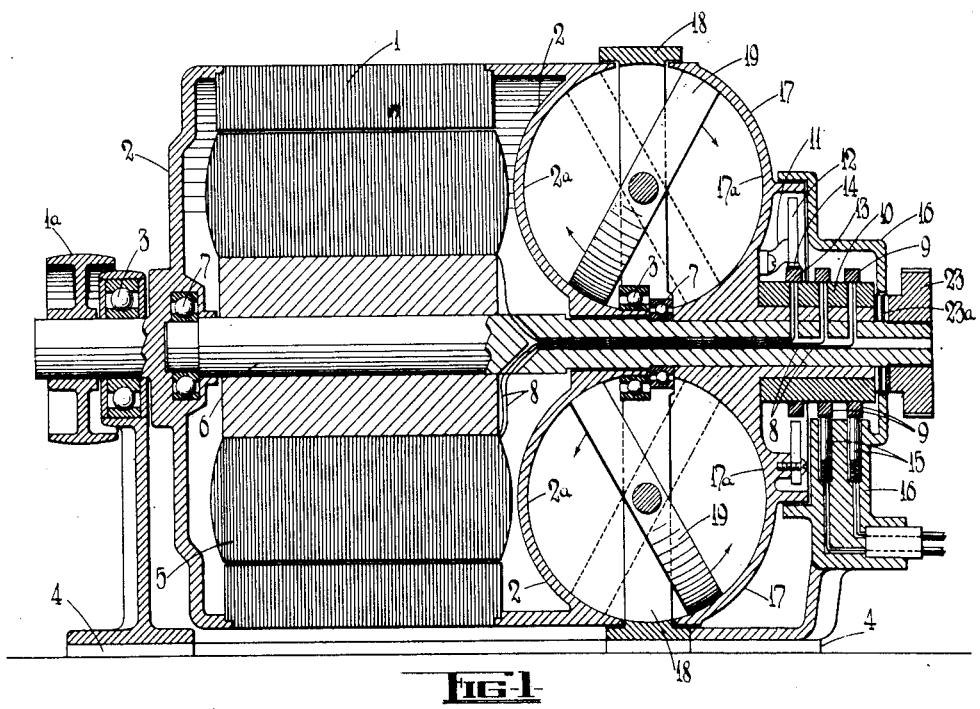

Oct. 27, 1942.   T. T. SOLNESS   2,299,857
ELECTRIC MOTOR
Filed Jan. 2, 1940   3 Sheets-Sheet 1

Inventor:
T. T. Solness
By E. F. Wendroth
Atty

Oct. 27, 1942.                T. T. SOLNESS                2,299,857
                              ELECTRIC MOTOR
                           Filed Jan. 2, 1940            3 Sheets-Sheet 2
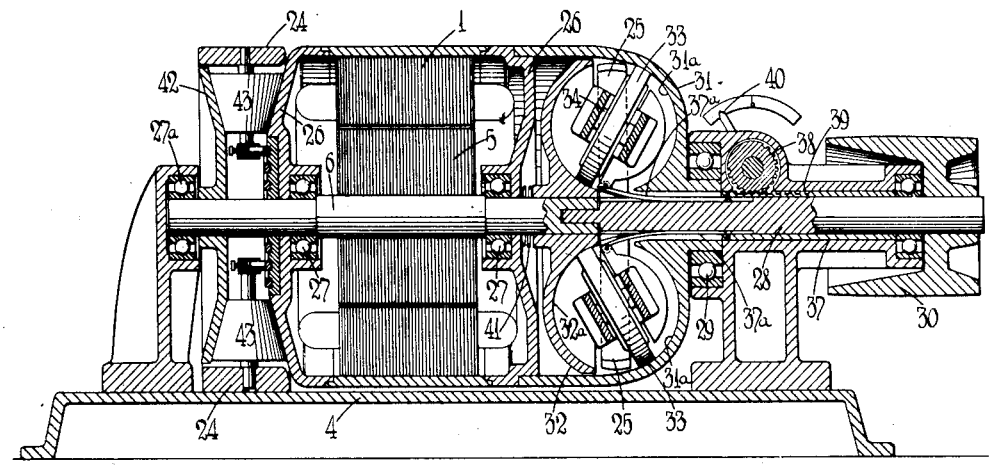
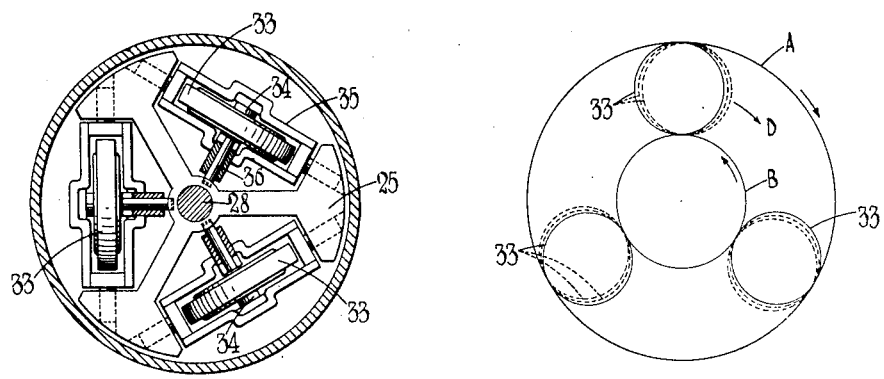
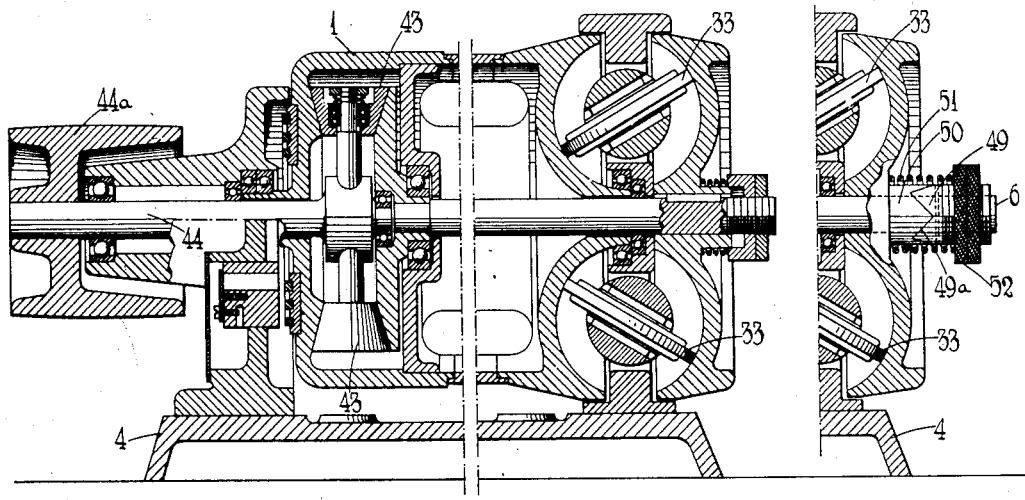
Inventor:
T. T. Solness,
By E. F. Wendroth
           Atty

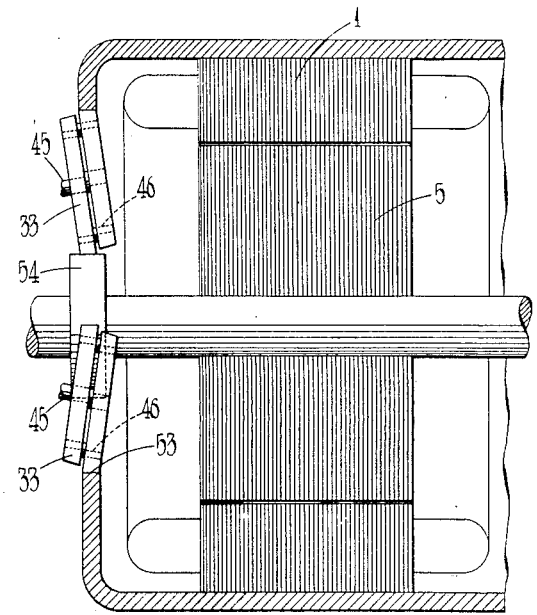
FIG-10-
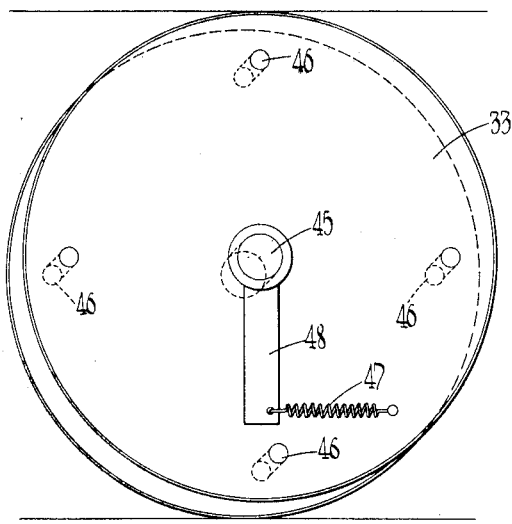
FIG-8-
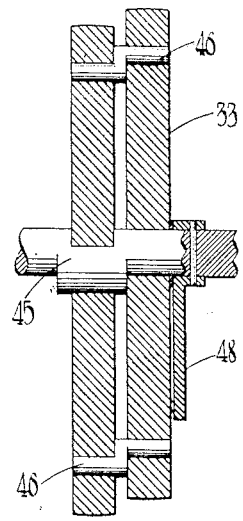
FIG-9-

Patented Oct. 27, 1942

2,299,857

UNITED STATES PATENT OFFICE 2,299,857

ELECTRIC MOTOR

Tuomo Tuisku Solness, Epsom, Auckland, New Zealand, assignor to Allspeed Electric Motors Limited, Auckland, New Zealand, a company of New Zealand Application January 2, 1940, Serial No. 312,162 In New Zealand May 24, 1939

5 Claims. (Cl. 172—239)

The invention relates to electric motors of the known type incorporating mutually reactive elements or members, adapted to rotate in opposite directions, either or both of said elements or members being used to transmit motion to apparatus requiring to be operated, said elements or members being capable of being braked or loaded, to ensure either or both being rotated at a desired speed or speeds, without varying the relative speed of rotation of said elements or members.

It is known in connection with the aforesaid type of motor, to provide a variable speed control, but the latter has up to the present, been obtained by braking or loading the elements or members externally of the motor, or through the apparatus driven or actuated therefrom.

The object of the present invention is to provide in motors of the aforesaid type improved variable speed control means, and also means for reversing the direction of rotation of the utilised turning movement derived from the motor, said means being incorporated or built in the motor itself, between the mutually reactive elements or members thereof, and being capable of being actuated or operated to result in infinitely variable speeds in either direction, within limits, of the elements or members, so that either the armature or the field of the motor may be rotated at normal speed, or either the armature or the field can be run at any desired speed between zero and full normal speed, and also if desired, so that both the armature and the field can be rotated at half full normal speed simultaneously, while at all times preserving the relative speed of rotation of said armature and said field, and maintaining full electrical efficiency.

Further, it is possible to vary the speed of rotation of the armature and the field either at intervals or continuously without effort, while the motor is running, and without impairing the efficiency thereof, or the changes of speed may be effected either manually or automatically as required.

An electric motor according to the invention, is of the mutually reactive element type, and has the reactive elements geared together to maintain their relative speeds of rotation constant, while the speed of rotation of the element from which turning movement is transmitted from the motor, is infinitely variable by adjusting the gearing between said reactive elements.

In order to obtain reversal of the turning movement transmitted from the motor, gearing between the reactive elements is mounted upon a rotary carrier which constitutes the element used to transmit the rotary movement from the motor, the speeds of rotation of the reactive elements being caused to act upon the gearing in manner such that the carrier is rotated in either direction as required.

The invention will however be fully described in conjunction with the accompanying drawings, wherein—

Figure 2:
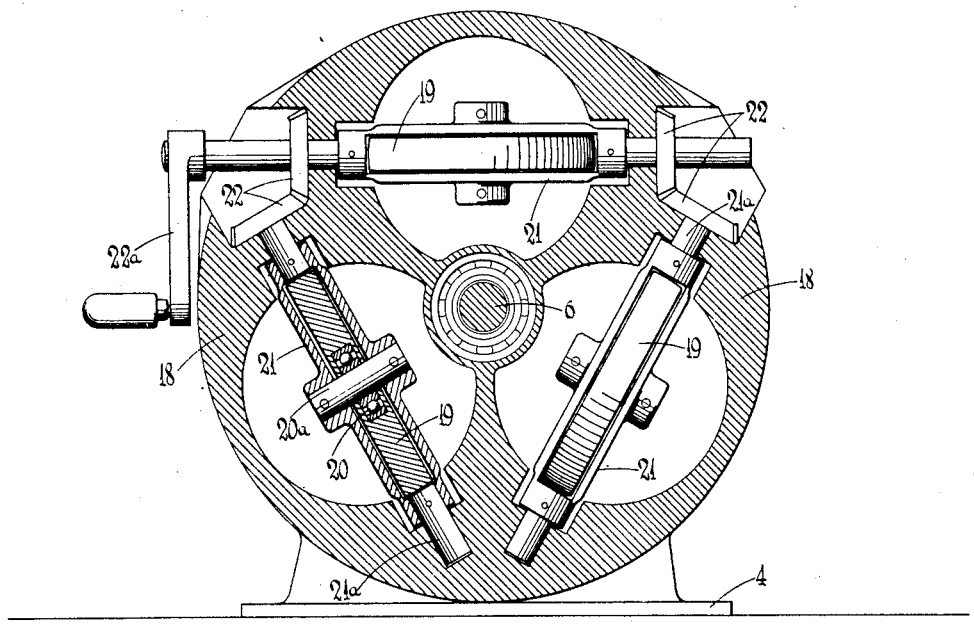

Figure 1 is a longitudinal sectional elevation of an electric motor constructed according to the invention, but without provision for reversing the direction of rotation of the part from which turning movement is transmitted, Figure 2 a cross sectional elevation of the motor illustrated in Figure 1, showing the means for mounting and operating the friction roller gearing used between the armature and the field, Figure 3 a longitudinal sectional elevation of a motor constructed according to the invention and provided with means for reversing the direction of rotation of the part from which turning movement is transmitted, Figure 4 a cross sectional elevation of the motor illustrated in Figure 3, showing the means for mounting and operating the friction roller gearing used between the armature and the field and which means are used to transmit turning movement, Figure 5 is a diagram illustrating how the turning movement and the reversal thereof, is obtained, Figure 6 a longitudinal sectional elevation (broken) illustrating a form of motor alternative to the form illustrated in Figure 3, Figure 7 a detail view in sectional elevation illustrating means whereby the pressure on the friction roller gearing used between the armature and the field, by said parts, is rendered proportional to the torque required at a given moment, Figures 8 and 9 are an elevation and a sectional elevation respectively of a non slip friction roller for use between the armature and the field, and Figure 10 a part sectional elevation of a motor, illustrating the employment of the roller shown in Figures 8 and 9, as non slip gearing.

In the motor illustrated in Figure 1 a field 1 is mounted between end shields 2, provided with centre portions which rest in ball bearings 3 supported from a base 4, while an armature 5 is fixed on a spindle 6 supported in ball bearings 7, one of which is housed in one of the field end shields 2, while the other spindle bearing 7 is supported from the base 4.

Both the field 1 and the armature 5 are free to rotate about a common axis, independently of each other, and the armature spindle 6 is bored axially to take terminal wires 8 from the armature winding through to slip rings 9 on an insulator 10, at one end of the motor, starting windings 11 coming through a "cut off" 12 connecting it with a further slip ring 13 on said insulator 10, by a contact 14.

Carbon brushes 15 contained in an insulating housing 16 supported from the base 4, are electrically connected with a source of electric current, said housing 16, also forming a cover for the slip rings 9, 13 and the "cut off" mechanism 12.

In order to obtain a braking or loading effect to and between the field 1 and the armature 5 so as to vary the speed of rotation of said members, one of the end shields 2 of the field 1 has formed in its outer surface, an annular groove 2a concentric with the axis of the motor, the cross sectional form of said groove 2a being approximately semi-circular.

Facing this grooved end shield 2 of the field 1, is a plate 17 fixed to the armature spindle 6 and designed and formed with an annular groove 17a therein to provide a counterpart to the grooved end shield 2 so that the annular grooves 2a and 17a in the latter and the plate 17 respectively, combine to provide an annular chamber about the motor axis, and concentric thereto, said end shield 2 and said plate 17 however, being free to rotate about the motor axis independently of each other.

Between the grooved end shield 2 of the field 1 and the plate 17 on the armature spindle 6, a support or stand 18 rises from the base 4, and in addition to supporting the bearings 3 and 7 at that end of the motor, for the field 1 and the armature 5, respectively, also provides the means for supporting friction rollers 19 housed or accommodated in the annular chamber formed by the annular grooves 2a and 17a.

The friction rollers 19 each have a diameter equal to the cross sectional diameter of the annular chamber aforesaid, and are supported therein, so that they can each be moved about an axis at right angles to the axis about which they rotate, to extend partly into the annular groove 2a in the end shield 2 of the field 1, and partly into the groove 17a in the plate 17 on the armature spindle 6, or be wholly accommodated in the support or stand 18 between said end shield 2 and the plate 17.

Each friction roller 19 is mounted on ball bearings 20 on a spindle 20a (Figure 2) held in a frame 21 having trunnions or stub spindles 21a supported by the support or stand 18 between the field end shield 2 and the plate 17, said roller carrying frames 21 being geared together by bevel gears 22 so that they can be operated from a single handle 22a located externally of the motor, to vary the inclination or set of the rollers 19 within the annular chamber, movement to vary said set or inclination taking place about the axes of the roller carrying frames 21.

The friction rollers 19 are free to rotate each about its own axis, which as before stated, is at right angles to the axis of the roller carrying frame 21, the axes of all of the latter being located in the one and the same plane which is at right angles to the vertical plane passing through the horizontal axis of the motor.

A nut 23 on the armature spindle 6 and a spring 23a in compression between said nut 23 and a boss on the plate 17, keeps the latter up to the grooved end shield 2 and the contact between the friction rollers 19 and said shield 2 and plate 17 uniform throughout, so that the surface speeds of the rollers 19 are always the same.

The rollers 19 do not travel about the horizontal axis of the motor, while the field end shield 2 and the plate 17 do, the latter and said shield 2 rotating in opposite directions while in contact with diametrically opposite points of the rollers 19.

If therefore, the inclination or set of the friction rollers 19 be such that the points of contact of the latter with the end shield 2 of the field 1, are located nearer the horizontal axis of the motor, than the points of contact of said rollers 19 with the plate 17 of the armature 5, rotation of the latter will be retarded to a greater extent than the rotation of the field 1, with the result that the speed of rotation of the armature 5 will decrease, while the speed of rotation of the field 1 will increase by the amount of decrease in the armature speed.

By reversing the positions of the friction rollers 19 across the annular chamber the opposite effect as between the field 1 and the armature 5 can be obtained, while, if the points of contact between the rollers 19 and the field end shield 2 and the armature plate 17, be all the same distance from the horizontal axis of the motor, the field 1 and the armature 5 will both rotate at the same speed.

As the rollers 19 can be set across the annular chamber in any position through 360 degrees, it follows that the difference in the speeds of rotation of the field 1 and the armature 5 can be determined with precision and through a considerable range, giving within limits an infinitely variable speed of rotation of either the armature 5 or the field 1, either or both of which can be utilised to perform useful work. In the present instance a pulley 1a on the field 1 provides the means through which rotary motion can be transmitted to other apparatus.

In the motor illustrated in Figure 3 there are also provided a fixed or non-rotary carrier 24 for gearing between the armature 5 and the field 1, and a rotary carrier 25 for gearing between said armature 5 and said field 1, any one of said armature 5, the field 1, or the rotary carrier 25 being capable of being utilised to transmit rotary motion to apparatus to be driven.

The rotary carrier 25 aforesaid and the gearing it carries, in addition to being capable of being utilised as the member through or from which rotary movement can be transmitted at varying speeds to the apparatus to be driven or operated, is capable of being made to reverse its direction of rotation, all changes of speed, and direction of rotation of said rotary carrier 25 being effected smoothly, and while, at all times preserving the relative speed of rotation of the armature 5 and the field 1, and maintaining full electrical efficiency.

In this reversible form of the motor the field 1 is mounted between end shields 26 fitted at their centres with ball bearings 27, through which the armature spindle 6 passes, said spindle being entered at one end in a bearing 27a supported from the base 4, and having rotatably entered in its other end, the end of a shaft 28 mounted in bearings 29 supported from the base 4, said shaft 28 having keyed thereon a pulley 30 or other gear or means from which rotary motion can be transmitted to apparatus to be driven or operated. Both the field 1 and the armature 5 rotate about a common axis, and the rotary carrier 25 is keyed or fixed on the pulley shaft 28 aforesaid to rotate therewith, and between an extension plate 31 from the field frame, and a plate 32 slidably keyed on the armature spindle 6, said plates 31, 32 having formed therein concentric to the axis of the motor, and so as to face each other circular grooves 31a and 32a respectively which combine to form an annular chamber the cross sectional shape of which is circular, space however being left between said plates 31, 32 to permit rotation of the carrier 25 therebetween.

Friction rollers 33 each having a diameter equal to the cross sectional diameter of the annular chamber, are supported therein by the rotary carrier 25 so that they can each be moved about an axis at right angles to the axis of the motor about which they rotate, to extend partly into the annular groove 31a in the extension plate 31 of the field 1, and partly into the groove 32a in the plate 32 on the armature spindle 6.

Each friction roller 33 is mounted on a spindle 34 held in a frame 35 (Figure 4) having trunnions or stub spindles 36 supported by the rotary carrier 25 between the field extension plate 31 and the plate 32 on the armature spindle 6, said roller carrying frames 35 being connected by flat springs 37a (Figure 3) or other flexible or jointed means with a sleeve 37 on the pulley shaft 28, capable of being operated through a pinion 38 and a circular rack 39 on the sleeve 37 from a handle or adjusting means 40 located externally of the motor, to vary the inclination or set of the rollers 33 within the annular chamber, movement to vary said set or inclination taking place about the axes of the roller carrying frames 35.

A spring 41 on the armature spindle 6 in compression between an end shield 26 of the field 1, and the plate 32 on the armature spindle 6, keeps said plate 32 up to the grooved extension plate 31 from the field 1. At the opposite end of the motor, to that at which the friction rollers 33 just described, are located, the fixed or non-rotary carrier 24 is located, said carrier 24 being held against rotation by being attached to the base 4, and supporting or carrying gearing, either friction or toothed, between an end shield 26 of the field 1 and a further plate 42 keyed on the armature spindle 6.

This gearing can comprise conical rollers 43 fitting or running between correspondingly formed or suitable surfaces on the end shield 26 and plate 42 just mentioned, and ensures the speed or speeds of rotation of the field 1 and the armature 5 being maintained constant.

With the armature 5 and the field 11 rotating in opposite directions about the axis of the motor at the same or different non-varying speed or speeds, and the friction rollers 33 in the annular chamber set or inclined across the latter so that diametrically opposite points on the peripheries of the rollers 33 are in contact with points on or portions of the extension plate 31 and the armature plate 32 at varying distances from the axis of the motor, it follows that not only will said friction rollers 33 be caused to rotate about their own axes, but the outer points or portions of the extension plate 31 or the armature plate 32, owing to their travelling faster than the inner points or portions thereof will cause the friction rollers 33 and the carrier 25 on which they are mounted, to rotate or travel about the axis of the motor and so drive the shaft 28 with the pulley 30 thereon.

If therefore, the inclination or set of the friction rollers 33 be such that the points of contact of the latter with the extension plate 31 of the field 1 are located nearer the horizontal axis of the motor, than the points of contact of said rollers 33 with the plate 32, on the armature spindle 6, the friction rollers 33 and carrier 25 will be caused to rotate about the motor axis in one direction, and by reversing the positions of the friction rollers 33 across the annular chamber between the extension plate 31 of the field and the armature plate 32, reverse rotation of the rollers 33 and carrier 25 will be obtained, and if the points of contact between the rollers 33 and the extension plate 31 and the armature plate 32, be all the same distance from the horizontal axis of the motor, the rollers 33 and the carrier 25 will not rotate about the motor axis.

The diagram at Figure 5 illustrates how the last described movement is obtained.

In the diagram 33 are the friction rollers, supported on the rotary carrier, not indicated, circle A represents a line of contact by said rollers with either plate 31 or plate 32 and circle B represents a line of contact by diametrically opposite points of said rollers 33, with the other of said plates 31, 32.

With the field 1 and the armature 5 rotating at the same speed but in opposite directions, circle A has a faster surface speed than circle B and causes the rollers 33 and the carrier supporting them to travel in the direction of the arrow D.

As the rollers 33 can be set across the annular chamber in various positions it follows that the difference in the speeds of rotation of the rollers 33 and carrier 25 in either direction about the motor axis can be determined with precision and through a considerable range, giving within limits an infinitely variable speed of rotation.

In the form of the motor described, when the rotary carrier 25 aforesaid is utilised as the driving member, an infinitely variable range of speeds in either direction is obtainable smoothly and without effort, and without interfering with the relative speeds of the armature 5 and the field 1, thereby maintaining electrical efficiency, reversal of direction of the rotary motion also being obtainable smoothly with a minimum of effort and without sacrificing electrical efficiency.

In an alternative form of the motor (Figure 6) the carrier for the friction rollers 33 which are located and operate in the annular chamber aforesaid is held against rotary motion, and the carrier for the gearing 43 between the armature 5 and the field 1 at the other end of the motor, is formed and mounted to rotate about the axis of the motor, and said last mentioned carrier has mounted on a spindle 44 extending therefrom a pulley 44a or other means for transmitting rotary motion to apparatus to be driven.

In this last mentioned form of the motor, the friction rollers 33 are operated solely to cause the armature 5 and the field 1 to rotate at varying speeds while maintaining their relative speeds and electrical efficiency, while the different speeds of the armature 5 and the field 1, act through the gearing 43 on the supporting carrier for same to impart rotation thereto, any one of the armature 5, the field 1, or the rotary carrier being capable of being utilised as the driving member, within an infinitely variable range of speeds.

In connection with the friction rollers 33 which are located and operate in the annular chamber aforesaid it is important that slip between said rollers 33 and the surfaces of the annular chamber with which they are in contact, should be avoided, and so as to overcome or render slipping impossible, each roller 33 is constructed so as to expand or increase its pressure against the surfaces between which it runs, in proportion to the power or load it transmits.

In a convenient form the friction roller 33 (Figures 8 and 9) comprises circular halves placed side by side and connected together by a cranked spindle 45 and cranked pins 46, capable of being operated to cause said roller halves to be slid in relation to one another, so that each half can be made to project beyond the periphery of the other.

The steps in the cranked spindle 45 and the cranked pins 46 are identical, so that turning movement imparted to any one of said spindle 45 or pins 46, results in exactly similar movement being given to the remaining pins 46 and spindle 45.

The cranks of the spindle 45 and the pins 46 are set so that rotation of the roller 33 about its own axis, as by a driving surface acting on the projecting portion of one of the halves of the roller, together with the resistance presented by the surface to be driven, to the projecting portion of the other half of the roller, tends to operate or move the cranks of the spindle 45 and pins 46 so that they act upon the halves of the roller 33 in such a way that the projection of the roller halves beyond each other tends to increase, thereby further expanding the roller 33 and increasing its pressure against the surfaces between which it runs and operates.

The roller spindle 45 is mounted in slotted bearings and the halves of the roller 33 are formed and are weighted or loaded as by a weight or spring 47 acting on an arm 48 on the roller spindle 45 so that normally the halves of the roller 33 tend to expand and press against the surfaces between which they run, so as to give initial pressure, which is increased by the rotation of the roller 33 and the driving and driven surfaces, in proportion to the load to be transmitted as before described.

Means are also provided for ensuring that the pressure on the inclinable friction rollers 33, by the shields or and plates between which they work, will be proportional to the torque required at any given moment, said means comprising a sleeve or collar 49 (Figure 7) fixed to the armature spindle 6 and formed with a toothed or scalloped end 49a, presented to a correspondingly formed end on a sleeve or collar 50 also surrounding said spindle 6 and fixed to the end shield or plate which is driving the armature spindle 6 by means of the inclinable rollers 33.

This end shield or plate is not keyed to the armature spindle 6 but is adapted to drive the latter through the interengaging correspondingly formed toothed or scalloped ends of the sleeves or collars 49, 50 aforesaid.

When the load on the armature spindle 6 increases, action or movement between the interengaging sleeve or collar ends aforesaid, causes the end shield or plate with the sleeve or collar 50 fixed thereto, to move towards the other of the shields or plates between which the friction rollers 33 work, and so increase the pressure or grip by the end shields or plates on said rollers 33.

By regulating the angle or inclination of the teeth or scallops in the interengaging ends of the sleeves or collars 49, 50 the pressure by the shields or plates on the friction rollers 33 can be made to suit the requirements of motors of various sizes and powers.

Also since the angle or slope of the teeth or scallops on or in the sleeves or collars 49, 50, is the same at both sides the direction of rotation of the motor can be reversed without interfering with the action of the device.

A spring 51 in compression, is provided between an adjustable stop 52 on the sleeve or collar 49, and the sliding shield or plate with the sleeve or collar 50 attached thereto, to provide or give an initial pressure or grip on the friction rollers 33.

When the field of the motor is the driven member, the arrangement just described is reversed.

A further form of nonslip friction gearing between the armature 5 and the field 1 of the motor, can comprise friction rollers 33 each formed of circular halves placed side by side and connected together by cranked spindles 45 and pins 46, as before described, mounted on a carrier so that the periphery of one half of each roller 33, engages a circular track or surface 53 (Figure 10) on the field 1, while the periphery of the other half of each roller 33 engages a circular track or surface 54 on the armature 5, the rotation of the field 1 and the armature 5 in contact with said rollers 33, being responsible for their expansion and consequent increase of pressure against the running surfaces of the field 1 and the armature 5, thereby avoiding slip of said rollers.

What I do claim and desire to obtain by Letters Patent of the United States of America is:

1. An electric motor, comprising rotatable armature and field elements, a fixed carrier disposed between said elements, gearing in said carrier between said elements for maintaining constant the speeds of rotation of the said elements, plates attached one to each of said elements, circular grooves formed in said plates, concentric to the motor axis, a second carrier extending about said axis, capable of rotation in either direction by said rotatable armature and field elements, frames pivotally supported in said second carrier, inclinable friction rollers mounted in said frames for adjustment in said grooves to vary the speed of rotation of the element used to transmit turning movement from the motor, means connected with said frames and operable from externally of the motor for adjusting the said rollers, and spring means for sliding one said plate toward the other plate to cause the grooves to form an annular chamber in which said rollers are gripped by said plates.

2. An electric motor, comprising rotatable armature and field elements, plates attached one to each of said elements, circular grooves formed in said plates, concentric to the motor axis, a carrier extending about said axis, capable of rotation in either direction by said rotatable elements, frames pivotally supported in said carrier, inclinable friction rollers mounted in said frames for adjustment in the grooves to vary the speed of rotation of the element used to transmit turning movement from the motor, a motor shaft, a sleeve on said shaft, a rack on said sleeve, flexible connections between said sleeve and said frames, a pinion meshing with said rack, an external handle for operating said pinion, and spring means for sliding one said plate toward the other plate to cause the grooves to form an annular chamber in which said rollers are gripped on said plate.

3. An electric motor, comprising a winding assembly consisting of concentric field and armature elements, rotatable in opposite directions, a rotatable shaft on which a selected element of said winding assembly is fast, and about which the other element of said winding assembly is rotatable, cooperating extensions in spaced relation to each other protruding from both elements of the winding assembly at each end thereof, two sets of rolling elements, one set between and in contact with each pair of extensions, a carrier for each set of rolling elements, one of said carriers being rotatable and the other fixed against rotation, a driven member connected to the rotatable carrier, the extensions at one end of said winding assembly having opposed annular grooves, together forming a circular annulus and in which annulus the cooperating rolling elements are rotatably mounted within their carrier for substantially universal rotation to vary their points of contact along the opposed annular walls of said recess, the extensions at the other end of said motor assembly being shaped in complementary manner to receive the second set of rolling elements, the elements of which second set are conical, and are disposed for contacting and rotating between said last-mentioned extensions and being mounted on shafts radially and rotatably disposed on the inner periphery of the cooperating carrier, the apices of the conical rolling members being directed towards the axis of said carrier, the extensions and conical rolling elements maintaining constant the adjusted speeds of rotation of the elements of said winding assembly, and means for varying the position of the rolling elements in said annulus, to vary the differential speed of the corresponding carrier.

4. An electric motor, comprising concentric field and armature, rotatable in opposite directions, a first, rotatable shaft on which said armature is fast, a second shaft axially aligned with said first shaft and rotatable relative thereto, the field being mounted for relative rotation about said first shaft, an extension from one end of said field encircling the region of said second shaft but in spaced relation thereto, and having part of a hollow annulus therein, a cooperating extension from the like end of said armature, and having a cooperating part of said annulus therein, power take-off means on said second shaft, a rotatable carrier in said annulus and fast to said second shaft, rollers mounted in frames in said carrier, said frames being mounted for rotation about axes at right angles to the axis of said carrier, springs mounted to said frames, a circular rack mounted about and movable longitudinally along the extension of said shaft and to which rack said springs are connected, a pinion meshing with said rack, means for rotating said pinion to adjust said frames and the rollers in said annulus, extensions at the other end of said field and armature, conical rollers therein, and a fixed carrier carrying said conical rollers, the fixed carrier and the conical rollers serving to maintain constant the adjusted speeds of said amature and field.

5. An electric motor, comprising rotatable field and armature elements, said elements having cooperating circular grooves at one end thereof, a fixed carrier at the other end of said elements, gearing disposed between and in contact with said elements to maintain constant the relative speed thereof, and comprising friction rollers disposed in said fixed carrier, a second carrier operably connected to and rotatable in either direction by said rotatable elements, additional gearing between said elements comprising inclinable friction rollers disposed on said rotary carrier within said circular grooves and adjustable by externally operable means, means for adjusting said additional gearing relative to said rotatable elements in such manner that the speed of rotation of said carrier is infinitely variable within the limits of rotational speed difference between said rotatable elements and also serving for reversing the direction of rotation of said rotary carrier, and means on said rotary carrier for transmitting torque from said motor.

TUOMO TUISKU SOLNESS.